R. A. BOWER.
FAUCET BRACKET FOR ELECTRICAL WATER HEATERS.
APPLICATION FILED FEB. 9, 1914.
1,097,293.
Patented May 19, 1914.
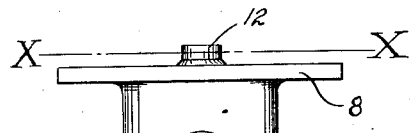
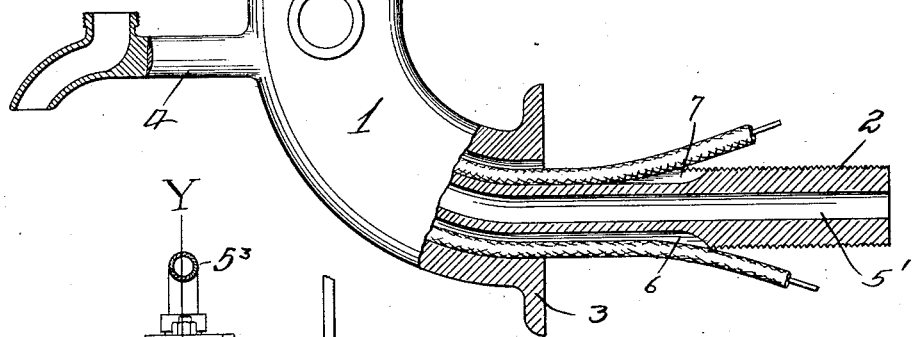
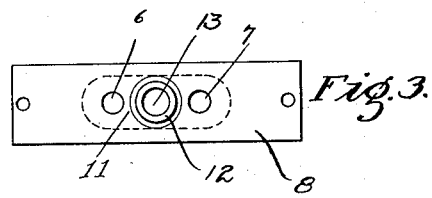
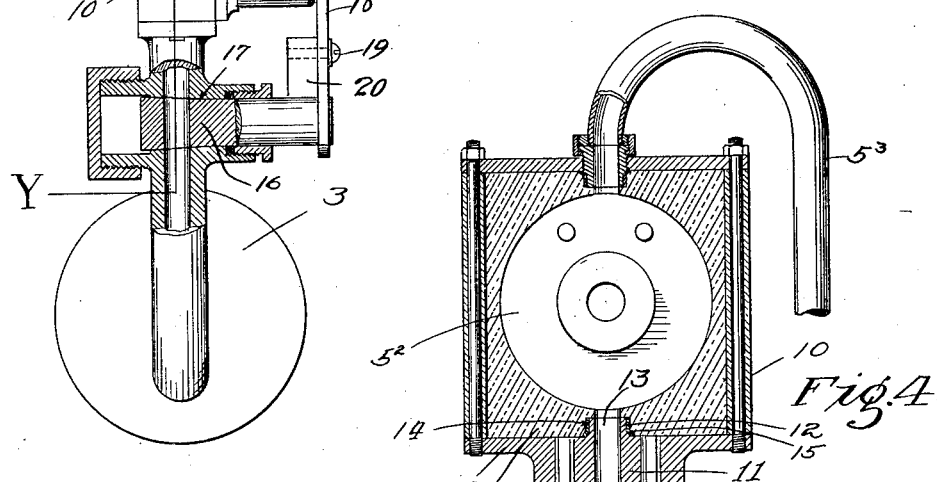
WITNESSES:
H. A. Stock
S. Constine
INVENTOR
Robert A. Bower
BY Acker, Totten
his ATTORNEYS

UNITED STATES PATENT OFFICE.

ROBERT A. BOWER, OF SAN FRANCISCO, CALIFORNIA.

FAUCET-BRACKET FOR ELECTRICAL WATER-HEATERS.

1,097,293.  Specification of Letters Patent.  Patented May 19, 1914.

Application filed February 9, 1914. Serial No. 817,491.

*To all whom it may concern:*

Be it known that I, ROBERT A. BOWER, a citizen of the United States, residing in the city and county of San Francisco and State of California, have invented certain new and useful Improvements in Faucet - Brackets for Electrical Water-Heaters, of which the following is a specification.

The present invention relates to that type of supporting brackets for use in connection with electrical water heaters connected directly to the faucet connection of a water supply; and the object of the invention is the production of a bracket wherein a water tight seal or non-leaky joint union is made between the same and the water heating chamber of the electrical unit, while at the same time providing a bracket for use in the kitchen and pantry of a house.

With the brackets for the support of the electrical water heaters in use at the present time, the water-way connection between the faucet bracket and the water heating chamber of the heating unit housing or casing is made by means of a removable nipple joint or stud, which requires the formation of a screw-threaded bore or socket being made in the supporting bracket and the forming of the bracket as a single casting.

To comprehend the invention, reference should be had to the accompanying sheet of drawings, wherein—

Figure 1 is a side view in elevation of the improved faucet bracket partly broken away, with the faucet spigot removed. Fig. 2 is a part broken perspective of the faucet bracket with heating casing or housing of the heating unit applied thereto. Fig. 3 is a plan sectional view taken on line $x$—$x$—Fig. 1 of the drawings. Fig. 4 is a cross sectional view on line $y$—$y$—Fig. 2 of the drawings.

In the drawings, the numeral 1 is used to indicate the body of the bracket, which is provided with a screw-threaded stem 2 for connecting with a water supply or service pipe, and a wall shield guard 3. From the body 1 projects the faucet outlet discharge nozzle 4 into and through which the water from the heating chamber $5^2$ of the casing or housing 5 of the electrical heater flows through a conducting pipe $5^3$. The body 1 is provided with the usual water way $5'$ and the separated conduits 6 and 7 for the electrical wires leading into the heater, and the said body terminates in a suitably shaped seat 8 for the reception of the base 9 of the casing 10 of the electrical heater. The electrical wires extend to the switch box $7'$ secured to one side of the housing 5 and the electrical current from the electrical wires into the heating chamber $5^2$ is controlled by a suitable snap switch $7^2$. From the partition wall 11 separating the conduits 6 and 7 projects the cored nipple or stud 12, the bore 13 of which communicates with the water passage-way $5'$ of the housing, and serves as a union connection with the water heating chamber of the casing or housing 10. The said nipple or stud 12 extends through a bore 14 in the base 9 of the casing or housing 10 and is securely held therein by means of an insoluble packing 15, for the making of a water tight joint or seal union between the said parts. The water flowing through the water-way $5'$ of the faucet bracket and said valve is operated by a lever 18 which is connected by a screw 19 to a lug 20 secured to the stem of the valve in any suitable manner into the water chamber $5^2$ of the casing or housing 5 of the heating unit is controlled by a spigot or ported valve 16 rotatably mounted in the valve seats 17 formed in the body portion of the bracket.

By the described bracket, the machine work required to finish and screw-thread a seat in the body portion thereof to receive a finished removable screw-threaded connecting stud or nipple is dispensed with, thus permitting the bracket with its connecting nipple or stud to be cast as an integral structure and by so doing materially reducing the cost incident to the manufacture thereof.

Having thus described the invention what is claimed as new and desired to protect by Letters Patent is:—

1. As an article of manufacture, a faucet bracket for electrical water heaters formed from a single casting, the same comprising a body portion having a threaded stem and interiorly disposed conduit for electrical wires, a water-way extended through the body portion, a bored projecting connecting stud or nipple communicating with the said water-way, an outlet nozzle projected from the body, a seat formed on the body for the reception of the base of an electrical unit, and bearings in the body for the reception of a controlling valve or spigot for the water-way therein.

2. In a faucet bracket, the combination with the body portion thereof provided with a water-way therethrough and a conduit for electrical wires, of a bored connecting stud or nipple formed integral therewith and in communication with the water-way thereof, and said body portion having a seat surrounding the projecting stud or nipple for the reception of the base of a casing of an electrical heating unit.

3. In a faucet bracket, the combination with a body portion provided with a water-way therethrough and a conduit for electrical supply wires, of a projecting connecting nipple or stud integral therewith, a threaded stem for the body, a discharge outlet nozzle extended from said nozzle, a seat for the reception of the base of a casing of a heating unit surrounding the connecting stud or stem, a casing of a heating unit fitted to said seat and provided with a bore in the base thereof through which extends the connecting stud or nipple of the bracket body, and a packing joint union between the said nipple and the base of the casing, a water connection between the casing and the discharge outlet nozzle of the bracket, and a valve or spigot rotatably mounted within the body of the bracket for controlling the flow of water through the water-way thereof.

In testimony whereof I have signed my name to this specification in the presence of two subscribing witnesses.

ROBERT A. BOWER.

Witnesses:
HARRY H. TOTTEN,
D. B. RICHARDS.

---

Copies of this patent may be obtained for five cents each, by addressing the "Commissioner of Patents, Washington, D. C."